United States Patent
Cheng et al.

(10) Patent No.: US 12,480,918 B2
(45) Date of Patent: Nov. 25, 2025

(54) DISPOSABLE THIN-FILM PLATINUM HYDROGEN REFERENCE ELECTRODE

(71) Applicant: DIONEX CORPORATION, Sunnyvale, CA (US)

(72) Inventors: Jun Cheng, San Jose, CA (US); Yan Liu, Palo Alto, CA (US); Gary L. Gleave, Pleasanton, CA (US)

(73) Assignee: Dionex Corporation, Sunnyvale, CA (US)

( * ) Notice: Subject to any disclaimer, the term of this patent is extended or adjusted under 35 U.S.C. 154(b) by 429 days.

(21) Appl. No.: 18/068,246

(22) Filed: Dec. 19, 2022

(65) Prior Publication Data
US 2024/0201146 A1    Jun. 20, 2024

(51) Int. Cl.
*G01N 30/64* (2006.01)
*G01N 27/30* (2006.01)
*G01N 30/02* (2006.01)

(52) U.S. Cl.
CPC ........... *G01N 30/64* (2013.01); *G01N 27/301* (2013.01); *G01N 27/302* (2013.01); *G01N 2030/027* (2013.01)

(58) Field of Classification Search
CPC ............ G01N 30/64; G01N 2030/027; G01N 27/301; G01N 27/302
See application file for complete search history.

(56) References Cited

U.S. PATENT DOCUMENTS

| 4,062,750 A | 12/1977 | Butler |
| 2003/0111340 A1* | 6/2003 | Cheng ............... H01M 4/9058 204/275.1 |
| 2006/0003203 A1 | 1/2006 | Wang et al. |
| 2013/0091936 A1 | 4/2013 | Cheng et al. |

OTHER PUBLICATIONS

Nann et al., "A new dynamic hydrogen reference electrode for applications in thin-film sensor systems," Sensors and Actuators B 70 2000. 188-195 (Year: 2000).*
Honeychurch, "Design and application of liquid chromatography dual electrode detection," Electrochemistry, 2016, 13, 1-20 (Year: 2016).*
Fanavoll et al., "A microfluidic electrochemical cell with integrated PdH reference electrode for high current experiments," Electrochimica Acta 225 (2017) 69-77 (Year: 2017).*

(Continued)

*Primary Examiner* — Alexander S Noguerola

(57) ABSTRACT

The present invention relates to, in general, a disposable electrically insulating substrate surface comprising a platinum hydrogen reference electrode system structure, the use of such a substrate in a flow-through electrochemical cell assembly and methods of manufacturing said substrate. For example, in some embodiments, a disposable electrically insulating substrate surface comprising a platinum hydrogen reference electrode system structure, wherein the platinum hydrogen reference electrode system comprises an electrically conductive and electrochemically active platinum hydrogen reference electrode system region bound as a layer, directly or indirectly, to said substrate surface.

23 Claims, 9 Drawing Sheets

(56) References Cited

OTHER PUBLICATIONS

Geoff et al. "Internally charged palladium hydride reference electrode—Part 1: The effect of charging current density on long-term stability" Medical & Biological Engineering & Computing, vol. 16, No. 6, Nov. 1978, pp. 672-676.
Lunte et al. "Difference Mode Detection with Thin-Layer Dual-Elecrode Liquide Chromatography/Electrochemistry" Analytical Chemistry, vol. 57, No. 8, Jul. 1, 1985, pp. 1541-1546.
Rocklin et al. "Improved Long-Term Reproductivity for Pulsed Amperometric Detection of Carbohydrates via a New Quadruple-Potential Waveform" Analytical Chemistry, vol. 70, No. 8, Mar. 12, 1998, pp. 1496-1501.
Ives et al., Reference Electrodes Theory and Practice, 1961, p. 111, Academic Press, New York.
Kasem K.K., et al., "Platinum as a Reference Electrode in Electrochemical Measurements," Platinum Metals Review, Apr. 2008, vol. 52, No. 2, pp. 100-106.

\* cited by examiner

DISPOSABLE THIN-FILM PLATINUM HYDROGEN REFERENCE ELECTRODE

BACKGROUND

The present invention relates to, in general, a disposable electrically insulating substrate surface comprising a platinum hydrogen reference electrode system structure, the use of such a substrate in a flow-through electrochemical cell assembly and methods of manufacturing said substrate.

SUMMARY

A flow-through electrochemical detection cell is usually used after the separation of the liquid chromatographic columns in combination with electrochemical detection. The electrochemical detection makes possible separations of unique selectivity and direct detection without derivatization of separated analytes with unsurpassed sensitivity.

The flow-through electrochemical detection usually consists of three electrodes which are: a working electrode, a reference electrode and a counter electrode. In the cell, the working electrode may also be used as an indicator electrode on which electro-active analytes are oxidized or reduced depending on the applied potential on it. The electron transfer current or charge is detected and recorded for the quantitation of each analyte after the chromatographic separation.

Until now, the prevailing approach has used a gold working electrode, a platinum or a titanium counter electrode, and a reference electrode of a liquid type such as a silver/silver chloride electrode and a saturated calomel electrode. Over the years, working and counter electrodes have been subject of significant innovations and improvements whereas there were relatively fewer improvements of the reference electrode.

Additionally, with the increasing importance of capillary chromatography and of hyphenated detection techniques, there is a need to miniaturize the detection cells.

It has become necessary to reduce the total cell dead volume of the electrochemical flow-through cell installed in the upstream of other detection cell because a large dead volume in the electrochemical cell causes a significant reduction in the peak efficiency in the downstream detection cell.

Miniaturization of cells containing the conventional common reference electrode, such as silver/silver chloride or similar reference electrode is generally very difficult due to the space requirements and surface roughness of liquid junctions and because of general bulkiness of the reference electrode body.

In addition, this type of reference electrode shows other problems, such as ions leaking from the filling electrolyte solution, relative short lifetime and large total cell dead volume if used with this type of reference electrode in the miniaturized electrochemical detection cell. Silver-silver chloride reference electrodes can also undergo a change, usually a positive shift, of reference potential during their exposure to alkaline eluents used in chromatographic carbohydrate and amino acid analysis. This leads to excessive potentials being applied to the working electrodes resulting in a gradually decreasing response and/or in narrowing of range of linearity of calibration plots. In extreme cases, working electrodes can be passivated with a loss of detection sensitivity.

Solid state type reference electrodes have the potential to be more easily miniaturized for use with the capillary electrochemical detection cell. The total cell dead volume can then be dramatically reduced to enable the cell used in front of other detection cells. Furthermore, it offers some other potential advantages compared to the silver/silver chloride reference electrode, for example longer lifetime, less maintenance, more robust, and ease of use.

For example, solid state type reference electrodes do not leak ions like potassium and chloride in the silver/silver chloride kind reference electrode, and multiple ED cells can be used in series and combined with different detection techniques, such as ED-MS for developing new applications.

So far, only a palladium-hydrogen solid-state true reference electrode has been realized in liquid chromatographic flow-through cell using a secondary power source providing a continuous supply of hydrogen to the palladium electrode in our laboratory [1, Cheng et al., "Electrochemical detection cell for liquid chromatography system", U.S. Pat. No. 8,342,007 B2].

Palladium has the ability to strongly absorb hydrogen (up to 900 times of its volume) and is converted to various forms of palladium hydride, i.e., $\alpha$, $\alpha+\beta$, $\beta$ phases during discontinuous charging as reported before. The phase was defined by the ratio of H/Pd (PdHx): x<0.03 ($\alpha$); x: 0.03-0.59 ($\alpha+\beta$); x>0.59 ($\beta$) (see, e.g., Dobson et al., "Some Experimental Factors which Govern the Potential of the Palladium Hydride Electrode at 25 to 195° C.," J. Chem. Soc., Faraday Trans. 1, 1972, vol. 68, pp. 749-763; Dobson et al., "Plateau Potentials of the $\alpha+\beta$ Palladium Hydride Electrode at Temperatures between 25 and 195° C.," J. Chem. Soc., Faraday Trans. 1, 1972, vol. 68, pp. 764-772).

Therefore, without a continuous supply of hydrogen from the outside, the palladium-hydride phases can lose their hydrogen content and convert back to pure palladium, and thus the continuous or regularly charging of the reference electrode becomes necessary.

Therefore, solid-state palladium hydride reference electrodes have some intrinsic drawbacks:

1. Require too much time, two or more hours to be initialized before ready for use.
2. May shorten lifetime if used under extremely high concentration of hydroxide, i.e., 1 M NaOH.
3. Increase dimension after absorbing large volumetric quantities of hydrogen, subsequently forming palladium hydride.

Additionally, miniaturization of solid-state palladium hydride reference electrodes has proved difficult due to poor adhesion of the palladium film triggered by the intrinsic drawback #3 as described above, resulting in a very short lifetime.

It would therefore be useful to provide a detection cell with a disposable reference electrode assembly which overcomes the above and other disadvantages of known disposable reference electrodes, such as providing more stable reference potential, longer lifetime, less maintenance, more robust electrode body, and no filling electrolyte solution required.

The listing or discussion of an apparently prior-published document in this specification should not necessarily be taken as an acknowledgement that the document is part of the state of the art or is common general knowledge.

The present invention therefore provides a disposable electrically insulating substrate surface comprising a platinum hydrogen reference electrode system structure, wherein the platinum hydrogen reference electrode system comprises an electrically conductive and electrochemically active platinum hydrogen reference electrode system region bound as a layer, directly or indirectly, to said substrate surface.

This is hereinafter referred to as "the disposable substrate" or the "substrate of the invention".

The present invention also provides the use of the disposable substrate in a flow-through electrochemical cell assembly for a chromatography system and a flow-through electrochemical cell assembly for a chromatography system, wherein the system comprises at least:

a disposable substrate as defined herein;

A cell body; and

A gasket defining a sample flow pathway extending between an inlet and an outlet of the detection cell and in fluid contact with the cell body and the working electrode; wherein the platinum hydrogen reference electrode system is in fluidic contact with the outlet and the platinum anode electrode is operably connected to a positive pole of a power supply and the platinum cathode electrode is operably connected to a negative pole of the power supply This is hereinafter referred to as "the flow-through cell" or "the flow-through cell assembly of the invention".

The present invention further provides a method for making a disposable electrically insulating substrate surface comprising a platinum hydrogen reference electrode system structure and sample flow channel for use in an electrochemical cell assembly for a chromatography system, said method comprising:

(a) vapor depositing electrically conductive and electrochemically active platinum material, directly or indirectly, onto a polymer substrate (such as an organic polymer substrate) through a mask to form a pattern of a reference electrode region, and (b) forming a fluid seal between said reference electrode system region and a perimeter wall to define a fluid sample flow channel with said reference electrode system region in direct fluid contact with said fluid sample flow channel.

This is hereinafter referred to as the "method" or "the method of the invention".

As used in the present invention, the term "disposable" is intended to mean that the substrate is intended to be thrown away after use. Use may mean single or multiple use depending on the conditions used, for example the substrate may be disposed of when the response parameter deteriorate, such as compared to preset or predetermined parameters.

The disposable substrate may further comprise a working electrode structure comprising an electrically conductive and electrochemically active working electrode region bound as a layer, directly or indirectly, to the substrate surface and/or a counter electrode structure comprising an electrically conductive and electrochemically active working electrode region bound as a layer, directly or indirectly, to the substrate surface.

As used herein, the term "electrically conductive" is intended to mean that the electrode structure has a region of material that is able to conduct electricity. That is, the region comprises, consists or consists essentially of material that allows the flow of charge in one or more directions.

As used herein, the term "electrochemically active" is intended to mean that the electrode structure has a regional of material that can participate in electrochemical reactions enabling the electrode to produce electric energy as it discharges. That is, the regional comprises, consists or consists essentially of material that is chemically reactive to an electrolyte, such that it enables the electrode to produce electric energy as it discharges.

The platinum reference electrode system structure may comprise a thin-film platinum cathode electrode and a thin-film platinum anode electrode.

Where the substrate comprises a working electrode structure and/or a counter electrode structure these may be in the form of a thin-film working electrode and/or a thin-film counter electrode.

Typically, the reference electrode system structure, the working electrode structure and/or the counter electrode structure may have a thickness of from about 100 Å to about 30,000 Å thick, preferably from about 2,000 Å to about 20,000 Å thick.

The reference electrode system region, the working electrode regional and/or the counter electrode region is bound as a layer, directly or indirectly, to the substrate surface. This may be achieved by vapor deposition of the relevant electrically conductive and electrochemically active material, directly or indirectly, onto said substrate. For example, for the reference electrode may be formed via the vapor deposition of platinum to the substrate surface.

The disposable substrate may comprise a polymer, such as a polymeric sheet. For example, in a preferred aspect the disposable substrate may comprise an organic polymer, such as in the form of an organic polymeric sheet.

The organic polymer may be selected from at least one of polytetrafluoroethylene (PTFE), polyetheretherketone (PEEK), polyester (either polyethylene terephthalate or polyethylene naphthalate), polychlorotrifluoroethylene (Kel-F), polycarbonate, polyolefine, polyimide, polyetherimide and combinations thereof.

To aid adhesion of the reference electrode system region, the working electrode region and/or the counter electrode region an intermediate adhesion layer may be used.

The adhesion layer may be formed by vapor deposition onto said substrate.

The adhesion layer may be from about 50 Å to about 5,000 Å thick, preferably from about 200 Å to about 2,000 Å thick.

The adhesion layer may be formed of a material selected from the group consisting of titanium, tungsten, chromium, aluminium, vanadium, carbon, copper, chromium, nickel, zinc and alloys thereof, preferably titanium, tungsten, chromium, and alloys thereof.

The working electrode and/or counter electrode region may comprise a metal or a carbonaceous material. For example, a new type of the microfabricated disposable thin-film carbon electrode as developed for high-performance liquid chromatography-electrochemical detection in Cheng, J. et al., J. Chromatogr. A, 1198-1199 (2008), 148-153.

In an aspect of the invention, the disposable substrate comprising the reference, working and counter electrode structures may be an electrochemical chip.

The disposable substrate defined previously may be used in a flow-through electrochemical cell assembly for a chromatography system, wherein the flow-through electrochemical cell assembly for a chromatography system further comprises at least:

A cell body; and

A gasket defining a sample flow pathway extending between an inlet and an outlet of the detection cell and in fluid contact with the cell body and the working electrode; wherein the platinum hydrogen reference electrode system is in fluidic contact with the outlet and the platinum anode electrode is operably connected to a positive pole of a power supply and the platinum cathode electrode is operably connected to a negative pole of the power supply.

The components of the flow-through cell will depend on the composition of the disposable substrate. For example, where the disposable substrate comprises only a platinum hydrogen reference electrode system structure, the flow-through cell may comprise:

A cell body including a counter electrode in the form of the cell body or a wire;

A working electrode at a wire type insulated from the counter electrode; and

A gasket defining a sample flow pathway extending between an inlet and an outlet of the detection cell and in fluid contact with the cell body including the counter electrode and the working electrode; wherein the platinum hydrogen reference electrode system is in fluidic contact with the counter and working electrodes and the platinum anode electrode is operably connected to a positive pole of a power supply and the platinum cathode electrode is operably connected to a negative pole of the power supply.

However, where the disposable substrate comprises only a platinum hydrogen reference electrode system structure and a working electrode structure, the flow-through cell may comprise:

A cell body including a counter electrode in the form of the cell body or a wire; and A gasket defining a sample flow pathway extending between an inlet and an outlet of the detection cell and in fluid contact with the cell body including the counter electrode and the working electrode on the disposable substrate; wherein the platinum hydrogen reference electrode system is in fluidic contact with the counter and working electrodes and the platinum anode electrode is operably connected to a positive pole of a power supply and the platinum cathode electrode is operably connected to a negative pole of the power supply.

Finally, where the disposable substrate comprises a platinum hydrogen reference electrode system structure, a working electrode structure and a counter electrode structure, the flow-through cell may comprise:

A cell body; and

A gasket defining a sample flow pathway extending between an inlet and an outlet of the detection cell and in fluid contact with the cell body, the counter electrode, and the working electrode on the disposable substrate; wherein the platinum hydrogen reference electrode system is in fluidic contact with the cell body, counter and working electrodes, and the platinum anode electrode is operably connected to a positive pole of a power supply and the platinum cathode electrode is operably connected to a negative pole of the power supply.

In the flow-through electrochemical cell assembly at least a portion of the substrate surface may be exposed to the sample flow channel. For example, in the flow-through electrochemical cell assembly the reference electrode system region, the working electrode regional and/or the counter electrode region may be exposed directly to said sample flow channel, without an intermediate layer.

Another aspect of the present invention is directed to a chromatography system including any of the above-described flow-through cells. The chromatography system may include a plurality of flow-through cells, wherein the cells may be arranged in series.

As defined previously, the present invention also provides a method for making a disposable electrically insulating substrate surface comprising a platinum hydrogen reference electrode system structure and sample flow channel for use in an electrochemical cell assembly for a chromatography system.

In the method, at least a portion of the polymer substrate (such as organic polymer substrate) may be exposed to the sample flow channel.

The method may further comprise vapor depositing material such as gold through said mask, which mask forms a pattern of an electrically conductive lead interconnecting said working electrode and an electrically conductive contact region forming said disposable working electrode structure on said disposable electrically insulated substrate surface and/or vapor depositing material for example platinum through another said mask, which mask forms a pattern of an electrically conductive lead interconnecting said counter electrode and an electrically conductive contact region forming said disposable counter electrode structure on said disposable electrically insulated substrate surface.

In the method, before step (a), vapor deposition of an adhesion layer onto said polymer substrate (such as an organic polymer substrate) through a mask may be performed, wherein step (a) is then performed by vapor depositing said electrically conductive material and electrochemically active onto said adhesion layer.

As example of the fabrication workflow used is shown in FIG. 1.

The adhesion layer and substrate are as defined previously in relation to the disposable substrate.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

The invention will now be described by reference to the following, non-limiting, figures and examples.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the invention as defined by the appended claims.

The thin-film disposable platinum hydrogen reference electrode, together with thin-film working electrode and thin-film counter electrode if present, can be microfabricated by physical vapor deposition of two or three different metals, in sequential manner onto a clean surface of a polymeric sheet with pre-punched alignment holes.

Figure 1:
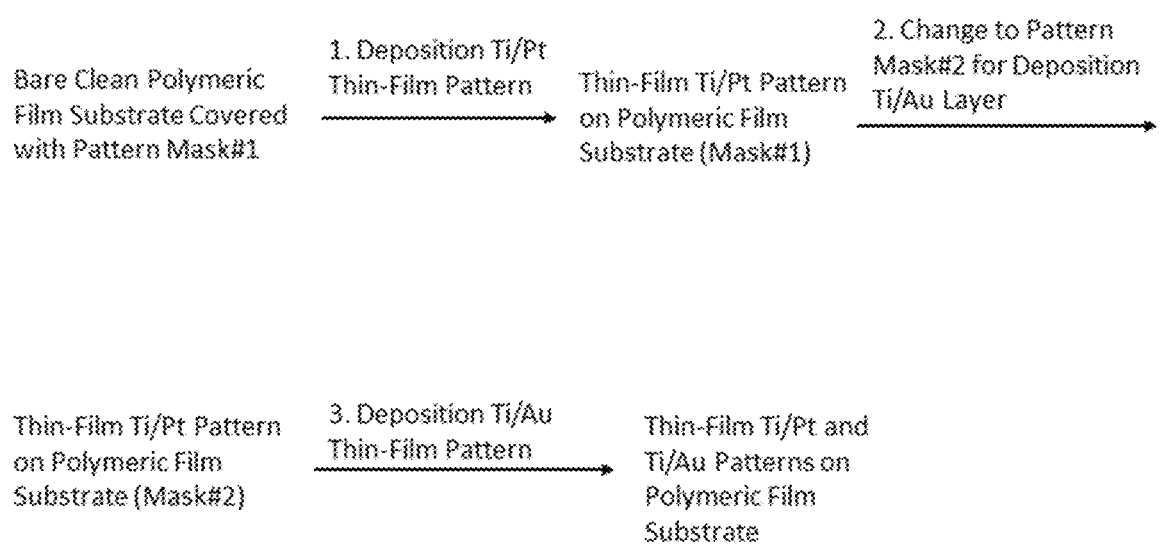
FIG. 1—A typical fabrication workflow for a disposable thin-film platinum hydrogen reference electrode together with microfabricated thin-film working and counter electrodes deposited onto a polymeric film substrate.

A typical fabrication process of two types of thin-film metals, Pt/Au is shown in FIG. 1. The disposable thin-film platinum hydrogen reference electrode together with microfabricated gold working and platinum counter electrodes deposited onto the polymeric substrate.

Figure 2:
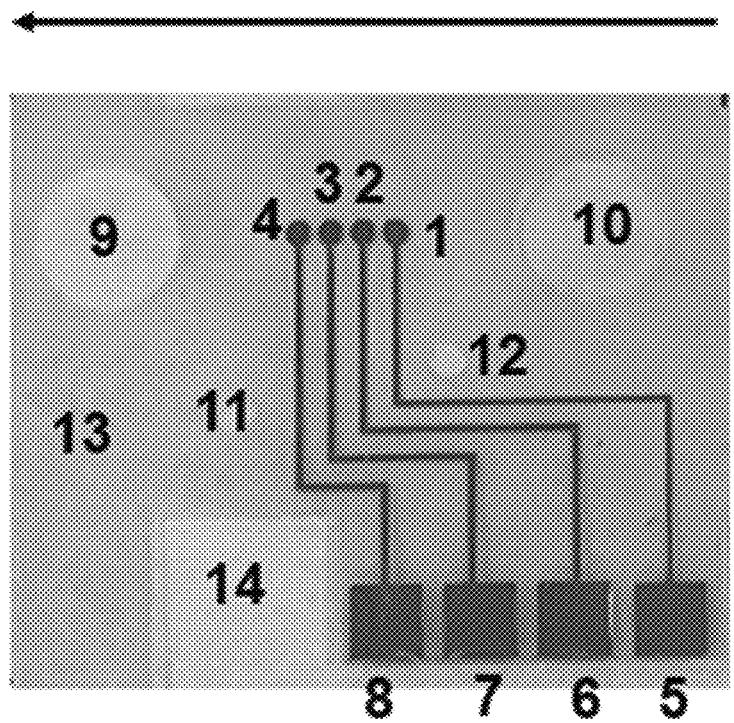
FIG. 2—Top view of a disposable thin-film platinum hydrogen reference electrode together with microfabricated thin-film working and counter electrodes deposited onto the polymeric film substrate: 1: WE, Au (thin-film); 2: CE, Pt (thin-film); 3: RE, Pt (thin-film, cathode); 4. RE, Pt (thin-film, anode); 5: WE Contact, Au (thin-film); 6: CE Contact, Pt (thin-film); 7: RE Contact, Pt (thin-film, cathode); 8. RE Contact, Pt (thin-film, anode); 9-10. Alignment holes (coarse); 11-12. Alignment holes (fine); 13. substrate (polymeric film); 14. Cutout.

A typical pattern (top view) for the disposable thin-film platinum hydrogen reference electrode (3, 4) together with microfabricated working (1) and counter electrodes (2) deposited onto the polymeric substrate (13) is shown in FIG. 2.

The first of the metals can be either titanium, tungsten titanium alloy or chromium and constitutes the so-called adhesion layer. It is used to improve adhesion of a second metallic layer to the polymeric substrate. The type of the microfabricated electrodes depends on the second metallic layer because only it is exposed to the mobile phase. Gold is most frequently used as the second metal, but platinum, copper, or silver can also be utilized. A non-metal carbon can also be selected as a top surface electrode material in combination with an adhesion layer consisting of titanium. The top surface also can be a combination of various metals and non-metal carbon. If various metals and non-metal carbon are used, the various top thin-film layers require to be deposited in different steps.

As defined previously, the thickness of the electrode material may be in the range of 100 to 30,000 Angstrom and the thickness range of adhesive layer may be from 50 to 5,000 Angstrom.

The polymeric substrate (13) may be in the form of a sheet/film and may have a thickness in the range of 0.002 to 0.020 inch and consists of polytetrafluoroethylene (PTFE), polyetheretherketone (PEEK), polyester (either polyethylene terephthalate or polyethylene naphthalate), Polychlorotrifluoroethylene (Kel-F), polycarbonate, polyolefine, polyimide or polyetherimide.

The polymeric film may be cleaned with pre-punched alignment holes with various organic solvents or other solutions. As described in FIG. 1, with the mask #1 on top of the polymeric film, all the patterns of platinum hydrogen reference electrode (3, 4) and platinum counter electrode (2) are deposited after the deposition of the adhesion Ti layer. After replacing the mask #1 with the mask #2, the pattern of gold working electrode (1) is deposited after the Ti deposition.

The pattern is designed to enable the use of disposable platinum hydrogen reference electrode, together with microfabricated thin-film working and counter electrodes if required, in a conventional electrochemical cell, for example in the Thermo Dionex ED cells.

In the disposable substrate of the invention, the working electrode (1) may connected by a thin lead (see: electrode (1)-to-contact lead (5) in FIG. 2) with a relatively larger contact area. This area may be brought into an electrical contact with the pin on the multiple electrical contact unit via thin lead (not shown). The lead/socket (5) may be contacted to the electrochemical detector. The reference electrode and the counter electrode may be connected the electrochemical detector in the same way.

The flow-through electrochemical cell assembly as defined in the present invention, typically includes three electrodes. However, the flow-through cell may have two or more electrodes in accordance with various embodiments, configurations, and design considerations. The older two electrode design uses the same two electrodes (working and reference) for adjustment of voltage and for current measurement whereas in three-electrode cells only the voltage is adjusted between the reference and working electrodes. The current measurements are taken between the working electrode and the counter electrode.

The counter electrodes are called auxiliary electrodes by some. However, in the context of this text the term auxiliary electrode is reserved for the second, anodic electrode of the two-electrode system of the platinum hydrogen reference electrode. There are reports describing chromatographic detection cells with more than three electrodes, for example, containing multiple working electrodes referenced to the same reference electrode (LUNTE et al, "Difference Mode Detection with Thin-Layer Dual-Electrode Liquid Chromatography/Electrochemistry," Anal. Chem., 1985, vol. 57, pp. 1541-1546). The platinum hydrogen reference electrode which is described here can be used with all of the above types of low dead volume chromatographic detection cells.

The disposable substrate as defined herein when used in a flow-through cell has eliminated the need for a large reference electrode compartment which was required when utilising silver/silver chloride electrodes, which enables effective miniaturisation of the flow-through cell.

The flow-through cell may also comprise a yoke-knob assembly (not shown), for assembly of the flow-through cell.

Figure 3:
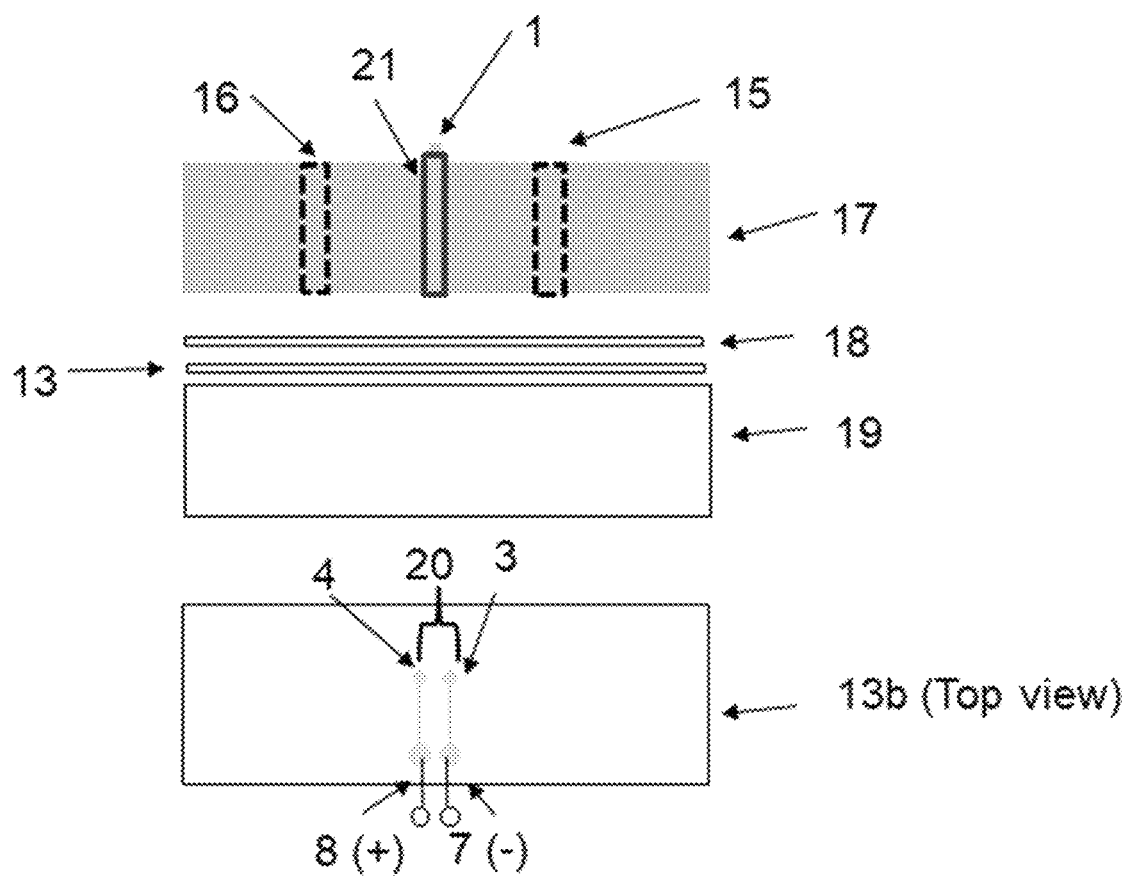
FIG. 3—Sideview of the detection cell with a disposable Pt/H2 reference electrode. 1: WE, Au (embedded wire on bottom block); 3: RE, Pt (thin-film, cathode); 4. RE, Pt (thin-film, anode); 7: RE Contact, Pt (thin-film, cathode); 8. RE Contact, Pt (thin-film, anode); 13/13b. Substrate (polymeric film)/Substrate (top view); 15. Inlet of sample line; 16. Outlet of sample line; 17. Counter electrode (Top block, titanium); 18. Gasket (polymeric film); 19. Bottom block (polymer); 20. Disposable Pt/H2 thin-film reference electrode; 21. Electric insulator (polymer).
Figure 4:
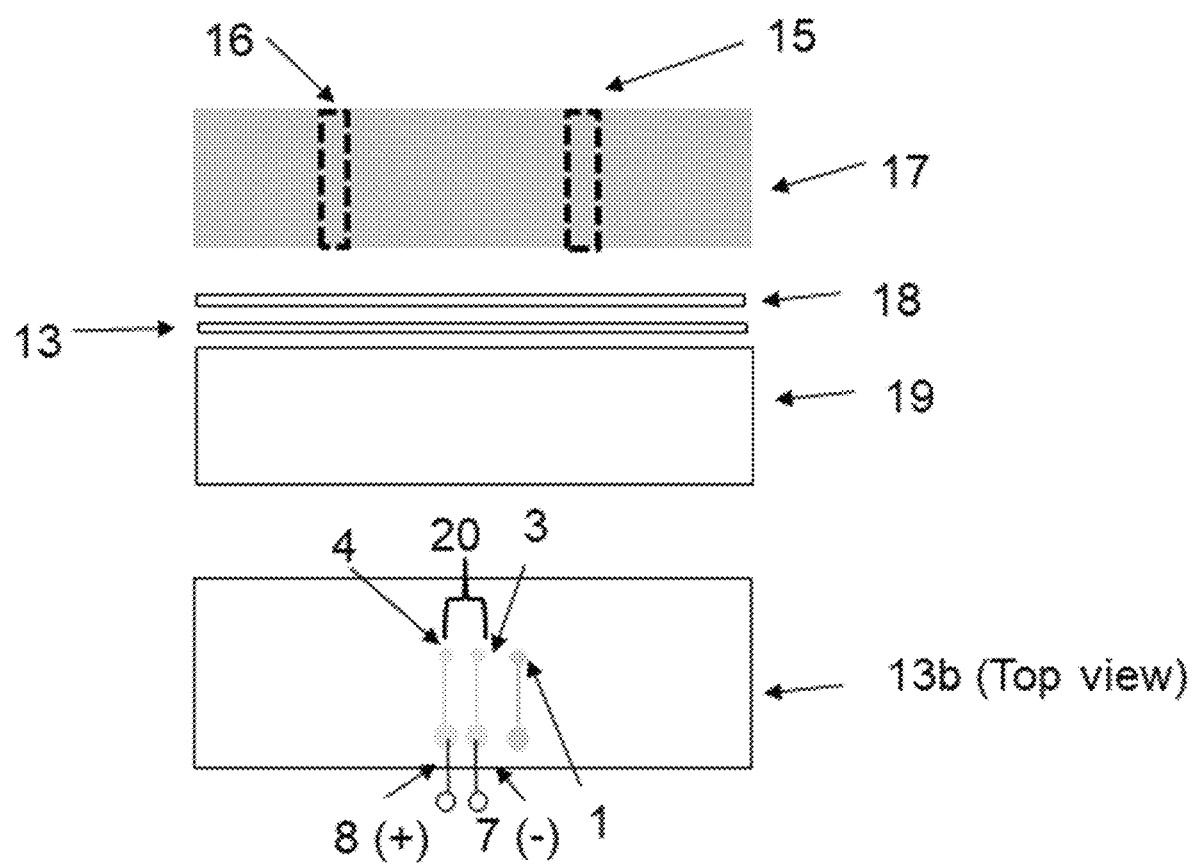
FIG. 4—Sideview of the detection cell with a disposable Pt/H2 reference electrode together with microfabricated working electrode. 1: WE, Au (thin-film); 3: RE, Pt (thin-film, cathode); 4. RE, Pt (thin-film, anode); 7: RE Contact, Pt (thin-film, cathode); 8. RE Contact, Pt (thin-film, anode); 13/13b. Substrate (polymeric film)/Substrate (top view); 15. Inlet of sample line; 16. Outlet of sample line; 17. Counter electrode (Top block, titanium); 18. Gasket (polymeric film); 19. Bottom Block (polymer); 20. Disposable Pt/H2 thin-film reference electrode.
Figure 5:
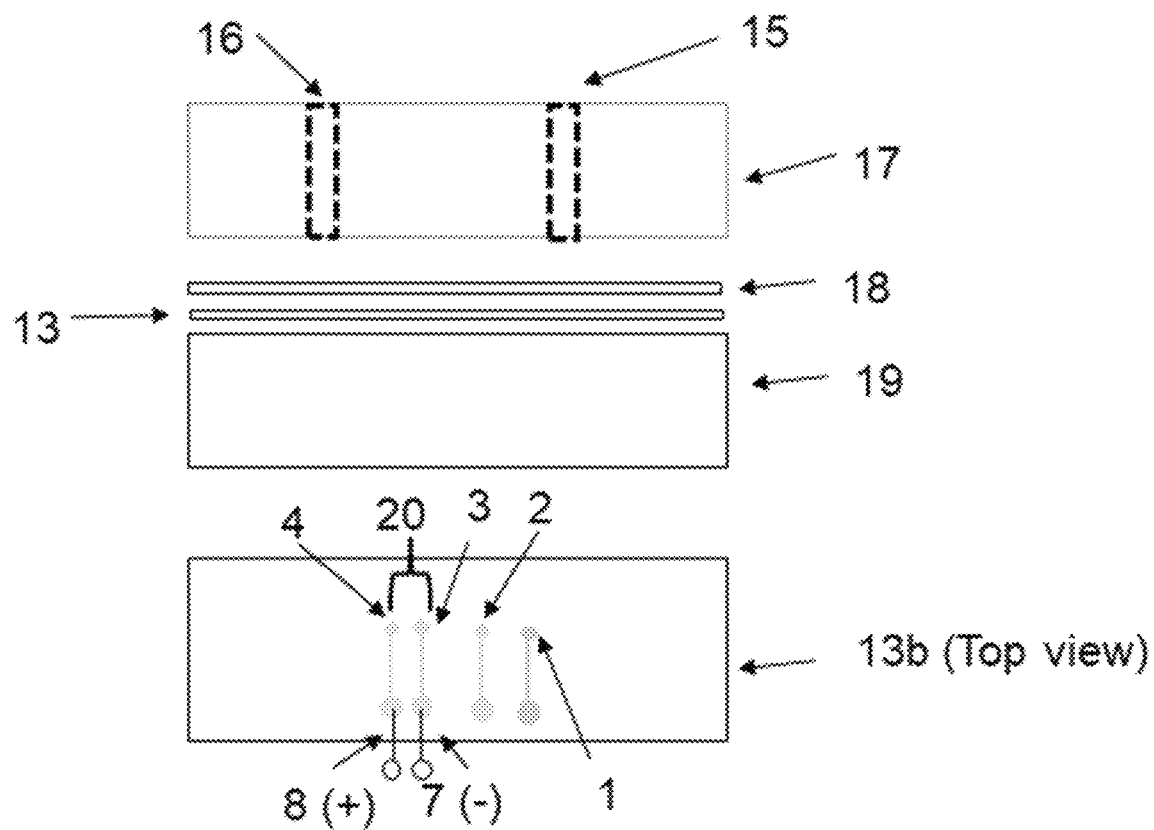
FIG. 5—Sideview of the detection cell with a disposable Pt/H2 reference electrode together with microfabricated working and counter electrodes. 1: WE, Au (thin-film); 2: CE, Pt (thin-film); 3: RE, Pt (thin-film, cathode); 4. RE, Pt (thin-film, anode); 7: RE Contact, Pt (thin-film, cathode); 8. RE Contact, Pt (thin-film, anode); 13/13b. Substrate (polymeric film)/Substrate (top view); 15. Inlet of sample line; 16. Outlet of sample line; 17. Top Block (non-conductive polymer); 18. Gasket (polymeric film); 19. Bottom Block (polymer); 20. Disposable Pt/H2 thin-film reference electrode.

Various illustrative embodiments of flow-through cells comprising the disposable substrate defined herein are illustrated in FIGS. 3, 4 and 5.

FIG. 3 illustrates an exemplary embodiment of the disposable substrate of the invention, where the disposable substrate comprises a thin-film platinum hydrogen reference electrode in a three-electrode electrochemical cell with a metallic top cell body.

FIG. 4 illustrates an exemplary aspect of the disposable substrate of the invention, where the disposable substrate comprises a thin-film platinum hydrogen reference electrode with a microfabricated thin-film working electrode in a three-electrode electrochemical cell with a metallic top cell body.

FIG. 5 illustrates an exemplary aspect of the disposable substrate of the invention, where the disposable substrate comprises a thin-film platinum hydrogen reference electrode with microfabricated thin-film working and counter electrodes in a three-electrode electrochemical cell with a non-conductive polymeric top cell body.

Suitable materials for cell body (17) will depend on whether the cell body includes the counter electrode (FIGS. 3 and 4). Where the cell body includes the counter electrode, suitable materials include, but are not limited to, titanium, high quality stainless steel or sturdy high conductive polymers.

Where the cell body does not include the counter electrode (FIG. 5), suitable materials include, but are not limited to study non-conductive polymers, such as polytetrafluoroethylene (PTFE), polyetheretherketone (PEEK), Polychlorotrifluoroethylene (Kel-F), polycarbonate, polyimide or polyetherimide.

The cell body is preferably machined or otherwise formed to include an inlet (15) and an outlet (16) which are fluidly connected with a thin-layer channel (not shown) defined by the gasket (18) to form a fluid sample flow line.

Preferably the inlet, channel and outlet are configured so as to minimize dead volume within the detection cell. In the illustrated configuration the thin layer path of the cell is formed by the gasket's (18) channel, however, one will appreciate that the thin-layer path of the cell can be formed by a microscopic groove machined in the body of the cell body.

For the purposes of the present invention, thin-layer channels are those with a volume in the range from about 1 pL to about 100 µL, such as from about 1 pL to 1 µL. The following ranges of flow path dimensions either within a gasket or as a finely machined microscopic groove can be used to form the low volume, thin layer flow path. Overall dimensions of the flow path may include a width of from about 0.01 mm to about 6 mm, such as from about 0.1 to about 3 mm, a length of from about 3 mm to about 24 mm, such as from about 6 to about 12 mm, and a thickness of from about 0.001 mm to about 1.0 mm, such as from about 0.0125 to about 0.5 mm. Preferable they include a width of approximately 0.5-2 mm, length of approximately 6-10 mm, and a thickness of approximately 0.0125-0.25. Most preferably, they include a width of approximately 0.5-1.5 mm, a length of approximately 6-9 mm, and a thickness of approximately 0.0125 to 0.05 mm.

As explained previously, in contrast to prior detectors which include a relatively bulky silver/silver chloride reference electrode, the detection cell of the invention includes at least a thin layer platinum hydrogen reference electrode structure on a disposable substrate.

In operation and use, the detection cell is used in a manner similar to that of known detectors having a conventional silver/silver chloride reference electrode. For example, the two Pt electrodes are connected to the cathode and anode of the power supply, respectively (FIGS. 3-5).

Additionally, the Pt cathode electrode is connected as a reference electrode to the electronic circuitry of the three-electrode detection system. The hydrogen reference electrode is generated by applying ca. 1.5 V from the power supply connected to the two Pt electrodes.

The Pt-based hydrogen electrode provides the reference potential depending on the pH of the eluent. For any new detection experiments, the correctly adjusted value of DC amperometric and pulsed electrochemical potentials can be recognized by achieving an approximately same level of baseline signal and similar peak areas as with the silver/silver chloride reference electrode. Alternatively, the reference potential of the Pt-based hydrogen electrode can be evaluated by potential measurement vs. a silver/silver chloride electrode installed in a second cell downstream from the first cell with an installed Pt-base hydrogen electrode like the palladium hydride reference electrode (2, Cheng et al., "Electrochemical detection cell for liquid chromatography system", U.S. Pat. No. 8,342,007 B2).

The reference electrode system of the present invention produces a stable reference potential which does not change upon exposure to alkaline solvents. In addition, the reference electrode assembly of the present invention does not exude any ions interfering with proper functioning of other detectors connected downstream.

The configuration of the reference electrode assembly of the present invention allows for steady reference potential during long term exposure to alkaline column eluates. Advantageously, there is no accidental application of excessive detection potentials to the working electrode resulting in downward trending of detection response over time or in narrower range of linearity of calibration plots.

As the platinum hydrogen reference electrode does not include any liquid junction as a typical liquid type reference electrode, there is an absence of electrolytes exiting from the reference electrode (e.g. chloride ions exiting from the silver/silver chloride electrode). Generally, the reference electrode assembly of the present invention provides for a longer useful life as compared with conventional silver/silver chloride reference electrodes and other liquid type reference electrodes.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

For the avoidance of doubt, in this specification when we use the term "comprising" or "comprises" we mean that the detection cell or system being described must contain the listed components but may optionally contain additional components. Comprising should be considered to include the terms "consisting of" or "consists of" where the flow-through cell or system being described must contain the listed component(s) only.

For the avoidance of doubt, preferences, options, particular features and the like indicated for a given aspect, feature or parameter of the invention should, unless the context indicates otherwise, be regarded as having been disclosed in combination with any and all other preferences, options particular features and the like as indicated for the same or other aspects, features and parameters of the invention.

The term "about" as used herein, e.g. when referring to a measurable value (such as an amount or parameter), refers to variations of +20%, +10%, +5%, +1%, +0.5%, or, particularly, +0.1% of the specified amount.

EXAMPLES

The equipment used in the experiments below were obtained from Thermofisher Scientific as indicated in the Tables, and detailed information can be found in the relevant product catalogue.

Figure 6:
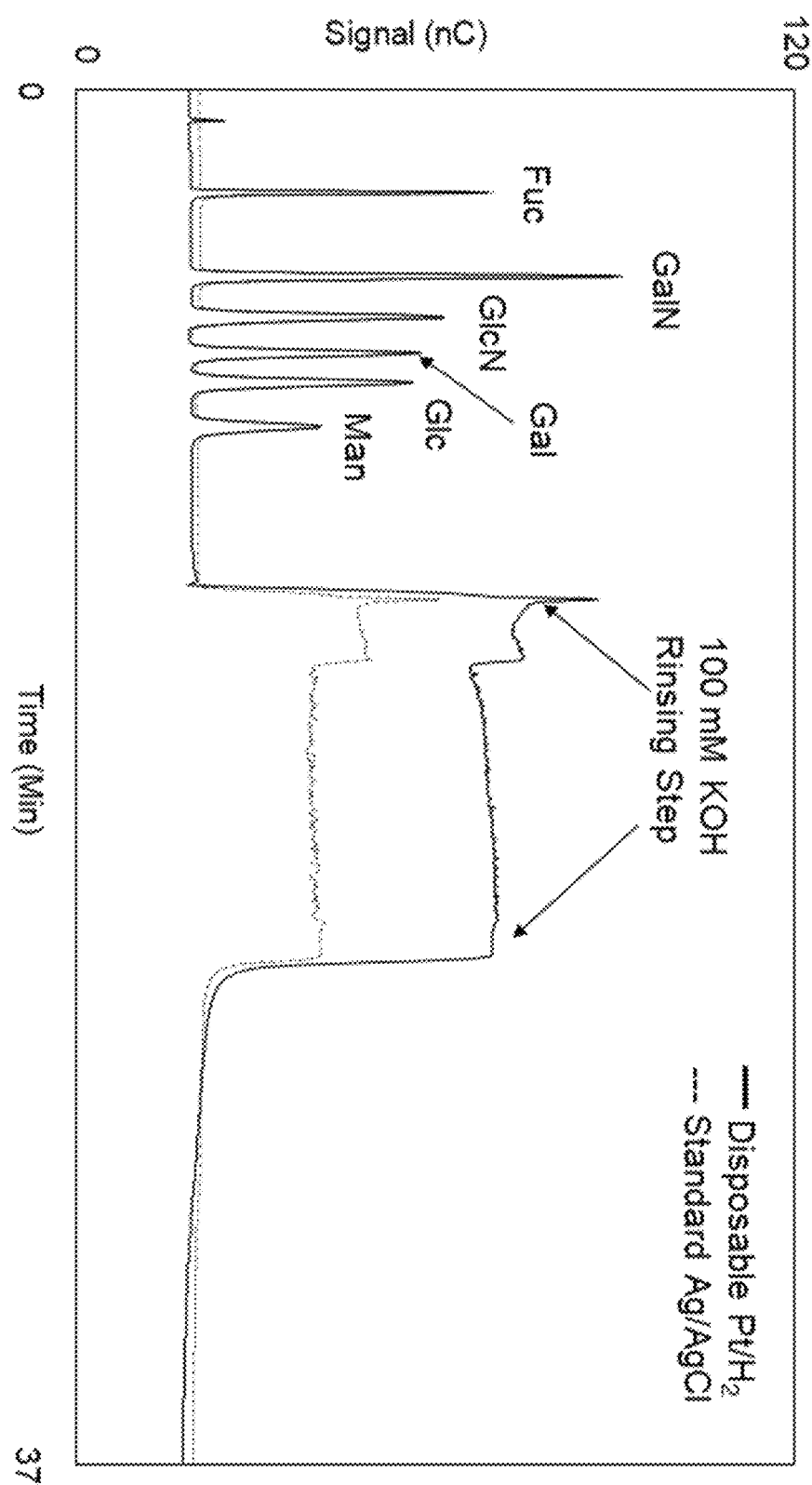
FIG. 6—Overlaid Chromatograms Obtained with New disposable Pt/H2 and Ag/AgCl reference electrodes in Current ED Cells: Mix of Six Monosaccharides.

Examples Obtained with Prototype Disposable Reference Electrodes on the Current ED Cell Example 1: Analysis of Mix of Six Monosaccharides Both chromatograms were generated with an ICS-5000+ system using the conditions of Table 1 and cell embodiments as FIGS. 4 and 5. The solid line trace chromatogram in FIG. 6 shows the trace obtained where all the reference, working and counter electrodes are disposable thin-film electrodes. The dashed line trace chromatogram was obtained with the standard Ag/AgCl electrode installed downstream of the flow-through cell with titanium cell body as the counter electrode but with the same disposable working electrode.

TABLE 1

Experimental Conditions for Analysis
of Mix of Six Monosaccharides

| | |
|---|---|
| Autosampler | Dionex ™ AS-AP Autosampler |
| Eluent | 10 mM KOH with a 100 mM KOH step rinsing (KOH EGC 500 with RFIC + degassers and CR-ATC, unless otherwise specified) |

TABLE 1-continued

Experimental Conditions for Analysis
of Mix of Six Monosaccharides

| | |
|---|---|
| Columns | CarboPac PA20 Analytical Column (3 × 150 mm) |
| Column Temp. | 30° C. |
| Detection Temp. | 30° C. |
| Flow Rate | 0.5 mL/min |
| Detection | Pulsed Amperometric Detection (R D. Rocklin et al., Anal. Chem. 1998, 70-1496-1501.) |
| Gasket Thickness | 2 mil (50 μm) |
| Working electrode | Disposable Au electrode (film) |
| Ref. Electrode | Standard Ag/AgCl or Prototype Pt/H$_2$ (film) |
| Inj. Vol. | 10 μL |
| Standard | 6 Mix Monosaccharides (10 μM) |
| Run Time | 37 Minutes |

*system control and data processing: Thermo Scientific Dionex Chromeleon® 7.2 software

TABLE 2

Performance Comparison of Ag/AgCl and disposable Pt/H$_2$ Reference Electrodes

| N = 3 | Peak Area (nC · min) | | | | | | Back-Ground (nC) | Noise (pC) |
|---|---|---|---|---|---|---|---|---|
| | Fuc | GalN | GlcN | Gal | Glc | Man | | |
| Standard AgCl | 4.33 | 9.91 | 8.53 | 7.09 | 7.53 | 4.90 | 29.4 | 23.7 |
| Disposable Pt/H$_2$ | 4.36 | 10.44 | 8.71 | 7.46 | 7.81 | 5.08 | 27.4 | 31.3 |
| Ratio* | 1.01 | 1.05 | 1.02 | 1.05 | 1.04 | 1.04 | 0.93 | 1.32 |

*Ratio = (Response of Prototype Pt/H)/(Response of Standard Cell).

Example 2: Analysis of Mix of Seven Alcohols

Figure 7:
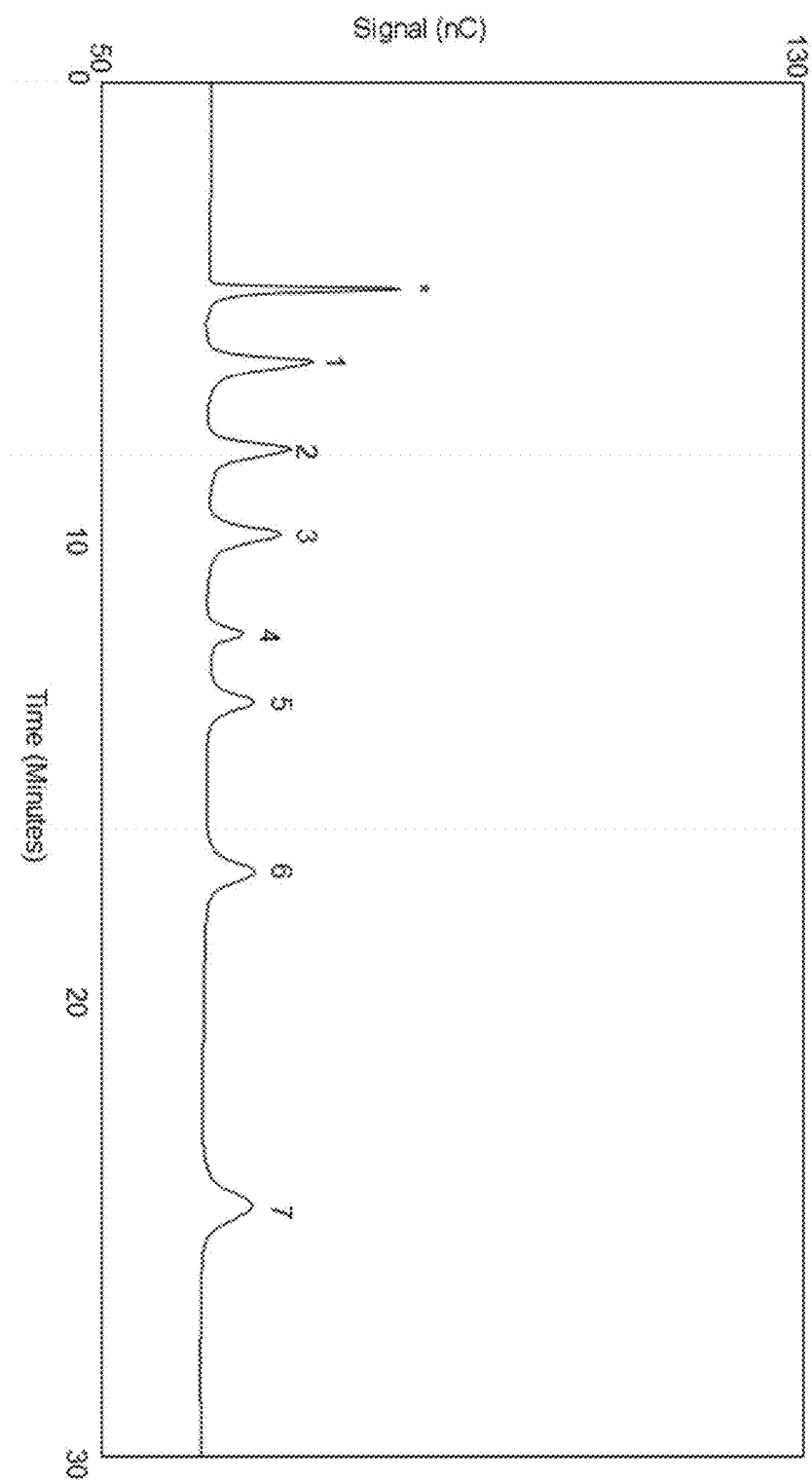
FIG. 7—A typical chromatogram obtained with new disposable Pt/H2 reference electrode in flow-through ED cells for analysis of mix of seven alcohols: 1. sorbitol; 2. glycerol; 3. ethylene glycol; 4. Methanol; 5. Ethanol; 6. 1-propoanlol; and 7. 1-butanol (50 ppm except for 1-butanol 100 pm); *: exclusion volume.

In FIG. 7, the chromatogram was generated with an ICS-5000+ system using the conditions of Table 3 and cell embodiment as FIG. 4. The disposable Pt electrodes Pt (3) and (4) were used as the cathode and anode of the Pt/H2 reference electrode while the disposable Pt electrode (2) was used as the working electrode. The conventional counter electrode is the titanium cell body.

TABLE 3

Experimental Conditions for Analysis of Mix of Seven Alcohols

| | |
|---|---|
| Autosampler | Dionex ™ AS-AP Autosampler |
| Eluent | 100 mM MSA |
| Columns | IonPac (4 × 250 mm) |
| Column Temp. | 30° C. |
| Detection Temp. | 30° C. |
| Flow Rate | 0.20 mL/min |
| Detection | Pulsed Amperometric Detection (J. Cheng et al., J. Electroanal. Chem. 2007, 608, 117-124.) |
| Gasket Thickness | 2 mil (50 μm) |
| Working electrode | Disposable Pt |
| Ref. Electrode | Prototype Pt/H$_2$ film |
| Counter Electrode | Ti Cell body |
| Inj. Vol. | 20 μL |
| Standard | Sorbitol, glycerol, ethylene glycol, methanol, ethanol, 1-propanol and 1-butanol. |

*system control and data processing: Thermo Scientific Dionex Chromeleon® 7.2 software

Example 3: Analysis of Fluorodeoxyglucose (FDG), Fluorodeoxymannose (FDM) and Chlorodeoxyglucose (CDG)

Figure 8:
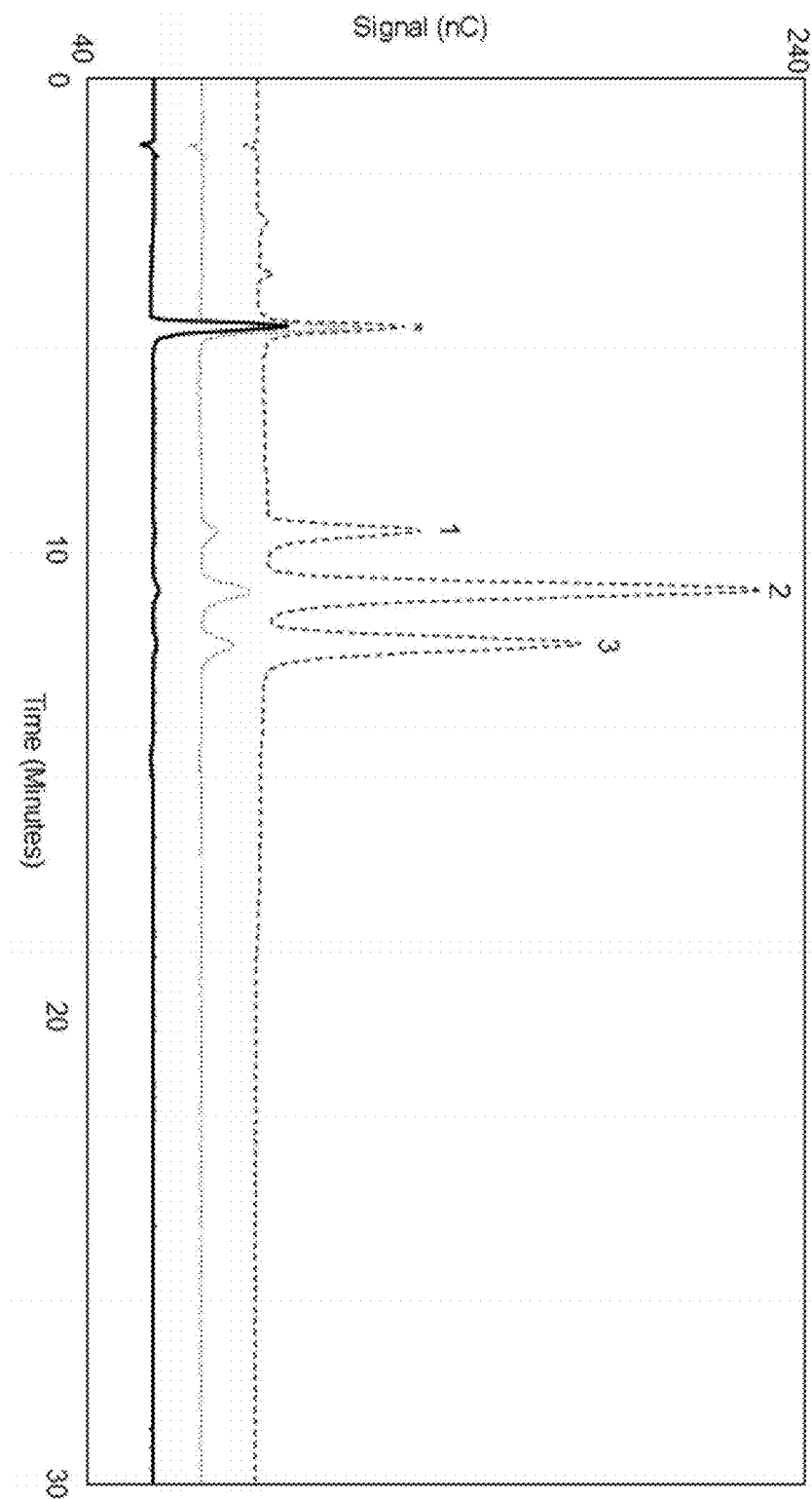
FIG. 8—Overlaid Chromatograms Obtained with New disposable Pt/H2 reference electrode in flow-through ED Cells for analysis of fluorodeoxyglucose (FDG), fluorodeoxymannose (FDM) and chlorodeoxyglucose (CDG): 0.5 ppm (solid line); 5 ppm (dotted line) and 50 ppm (dashed line); *: system peak.

In FIG. 8, the chromatogram was generated with an ICS-5000+ system using the conditions of Table 4. Both the platinum hydrogen reference electrode system and the working electrode are disposable thin-film electrodes, but the counter electrode is non-disposable Ti cell body.

The chromatograms were collected with various concentrations of Fluorodeoxyglucose (FDG), Fluorodeoxymannose (FDM) and Chlorodeoxyglucose (CDG) in FIG. 8.

TABLE 4

Experimental Conditions for Analysis of Fluorodeoxyglucose (FDG), Fluorodeoxymannose (FDM) and Chlorodeoxyglucose (CDG).

| | |
|---|---|
| Autosampler | Dionex ™ AS-AP Autosampler |
| Eluent | 100 mM KOH (KOH EGC 500 with RFIC + degassers and CR-ATC, unless otherwise specified) |
| Columns | CarboPac PA10 (Analytical 4 × 250 mm; Guard 4 × 50 mm) |
| Column Temp. | 30° C. |
| Detection Temp. | 30° C. |
| Flow Rate | 1.0 mL/min |
| Detection | Pulsed Amperometric Detection (R D. Rocklin et al., Anal. Chem. 1998, 70, 1496-1501.) |
| Gasket Thickness | 1 mil (25 μm) |
| Working electrode | Disposable Au electrode (film) |
| Ref. Electrode | Disposable Prototype Pt/$H_2$ (film) |
| Inj. Vol. | 10 μL |
| Standard | FDG, FDM and CDG at different concentrations |

*system control and data processing: Thermo Scientific Dionex Chromeleon® 7.2 software

Example 4: Analysis of Mix of Mono- and Di-Saccharides

Figure 9:
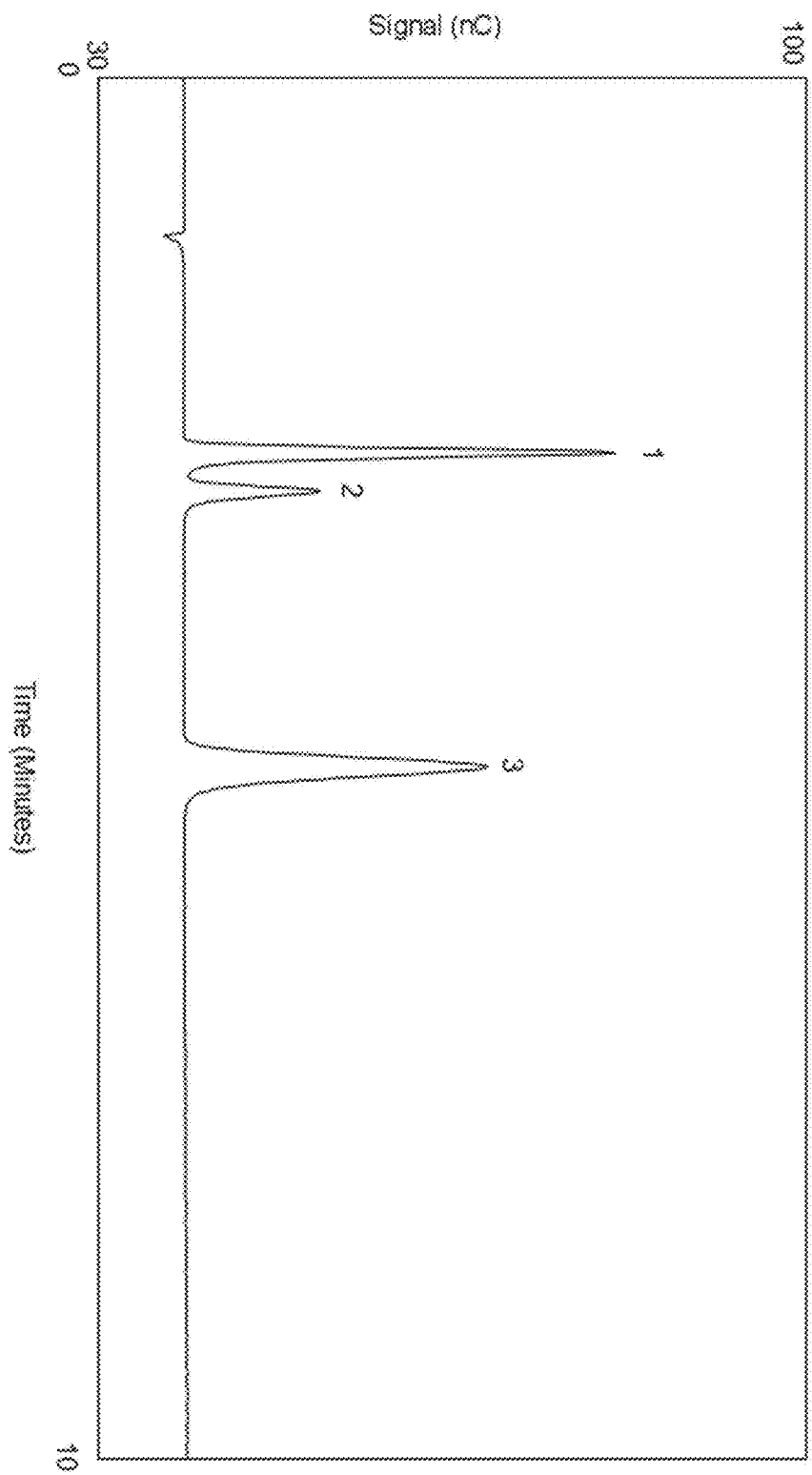
FIG. 9—A typical chromatogram obtained with new disposable Pt/H2 reference electrode in flow-through ED Cells for analysis of mix of mono- and di-saccharides: 1. glucose; 2. fructose; and 3. Sucrose.

The chromatogram was generated with an ICS-6000 system using the conditions of Table 5 and cell embodiment as FIG. 4. Both the platinum hydrogen reference electrode system and the working electrode are disposable thin-film electrodes but the counter electrode is non-disposable Ti cell body. The chromatograms were collected with mixture sample of glucose, fructose and sucrose in FIG. 9.

TABLE 5

Experimental Conditions for Analysis of Mono- and Di-Saccharides

| | |
|---|---|
| Autosampler | Dionex ™ AS-AP Autosampler |
| Eluent | 100 mM NaOH (A: water, B: 250 mM NaOH, 60% A/40% B) |
| Columns | CarboPac PA1 (Anal. 4 × 250 mm) |
| Column Temp. | 30° C. |
| Detection Temp. | 30° C. |
| Flow Rate | 0.5 mL/min |
| Detection | Pulsed Amperometric Detection (R D. Rocklin et al., Anal. Chem. 1998, 70, 1496-1501.) |
| Gasket Thickness | 2 mil (50 μm) |
| Working electrode | Disposable Au |
| Ref. Electrode | Disposable Pt/$H_2$ |
| Inj. Vol. | 10 μL |
| Standard | Glu, Frc and Suc |

*system control and data processing: Thermo Scientific Dionex Chromeleon® 7.2 software

Example 5: Analysis of 17 Amino Acids

Figure 10:
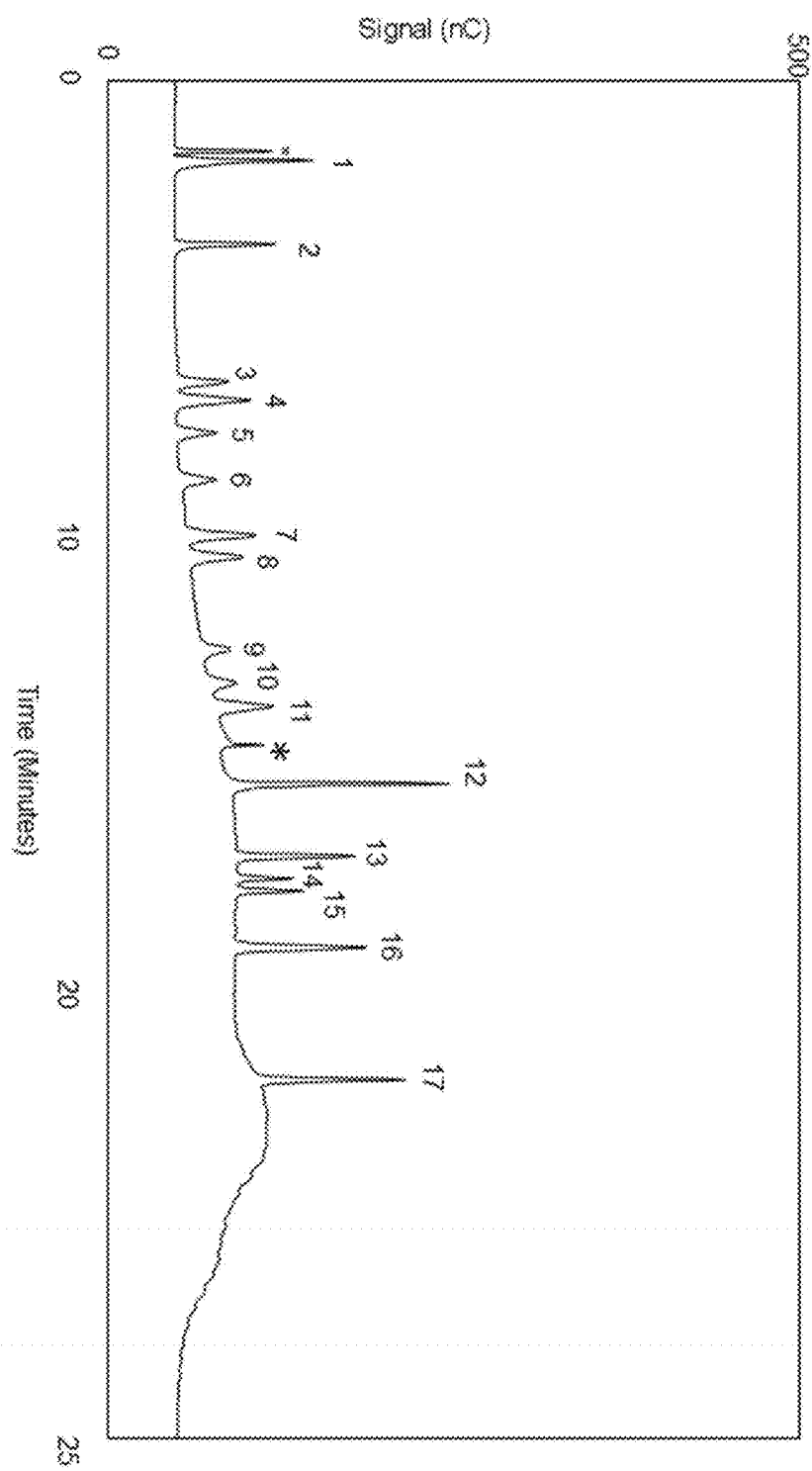
FIG. 10—A typical chromatogram obtained with new disposable Pt/H2 reference electrode in flow-through ED cells for analysis of 17 amino acids: 1. arginine; 2. lysine; 3. alanine; 4. threonine; 5. glycine; 6. valine; 7. serine; 8. proline; 9. isoleucine; 10. leucine; 11. methionine; 12. histidine; 13. phenylalanine; 14. glutamate; 15. aspartate; 16. cystine; 17. tyrosine; *: System peaks.

The chromatogram was generated with an ICS-6000 system using the conditions of Table 6 and cell embodiment as FIG. 4. Both the platinum hydrogen reference electrode system and the working electrode are disposable thin-film electrodes but the counter electrode is non-disposable Ti cell body. The chromatograms were collected with mixture of 17 common amino acids in FIG. 10.

TABLE 6

Experimental Conditions for Analysis of 17 Amino Acids

| | |
|---|---|
| Autosampler | Dionex ™ AS-AP Autosampler |
| Eluent | $H_2O$ (A)/0.25 NaOH (B)/1M NaAc (C) (gradient) |
| Columns | AminoPac PA10 (Anal. 2 × 250 mm; Guard 2 × 50 mm) |
| Column Temp. | 30° C. |
| Detection Temp. | 30° C. |
| Flow Rate | 0.25 mL/min |
| Detection | Integrated Pulsed Amperometric Detection (J. Cheng et al., Anal. Chem. 2003, 75, 572-579) |
| Gasket Thickness | 2 mil (50 μm) |
| Working electrode | Disposable Pt |
| Ref. Electrode | Disposable Pt/$H_2$ |
| Inj. Vol. | 25 μL |
| Standard | 17 Amino Acids |
| Run Time | 25 min |

*system control and data processing: Thermo Scientific Dionex Chromeleon® 7.2 software

The invention claimed is:

1. A disposable electrically insulating substrate surface comprising a platinum hydrogen reference electrode system structure, wherein the platinum hydrogen reference electrode system comprises an electrically conductive and electrochemically active platinum hydrogen reference electrode system region bound as a layer, directly or indirectly, to said substrate surface, wherein the thickness of the reference electrode system structure, the working electrode structure and/or the counter electrode structure is from about 100 A to about 30,000 A thick.

2. The disposable substrate of claim 1, wherein the substrate surface further comprises a working electrode structure comprising an electrically conductive and electrochemically active working electrode region bound as a layer, directly or indirectly, to the substrate surface.

3. The disposable substrate of claim 2, wherein the substrate further comprises a counter electrode structure comprising an electrically conductive and electrochemically active working electrode region bound as a layer, directly or indirectly, to the substrate surface.

4. The disposable substrate of claim 2, wherein the working electrode structure and/or the counter electrode structure is a thin-film working electrode and/or a thin-film counter electrode.

5. The disposable substrate of claim 2, wherein the working electrode and/or counter electrode region comprises a metal or a carbonaceous material.

6. The disposable substrate of claim 1, wherein the platinum hydrogen reference electrode system structure comprises a thin-film platinum cathode electrode and a thin-film platinum anode electrode.

7. The disposable substrate of claim 1, wherein the reference electrode system region, the working electrode regional and/or the counter electrode region is formed by vapor deposition of electrically conductive and electrochemically active material, directly or indirectly, onto said substrate.

8. The disposable substrate of claim 1, wherein the substrate comprises an organic polymer.

9. The disposable substrate of claim 8 in which said organic polymer is selected from the group consisting of polytetrafluoroethylene (PTFE), polyetheretherketone (PEEK), polyester (either polyethylene terephthalate or polyethylene naphthalate), polychlorotrifluoroethylene (Kel-F), polycarbonate, polyolefine, polyimide or poly etherimide.

10. The disposable substrate of claim 1, wherein the reference electrode system region, the working electrode region and/or the counter electrode region is bound through an intermediate adhesion layer to said substrate.

11. The disposable substrate of claim 10, wherein the adhesion layer is formed by vapor deposition onto said substrate.

12. The disposable substrate of claim 10, wherein the adhesion layer is between about 50 A and 5,000 A thick.

13. The disposable substrate of claim 10, wherein the adhesion layer is formed of a material selected from the group consisting of titanium, tungsten, chromium, and alloys thereof.

14. A disposable electrically insulating substrate comprising a surface having a platinum hydrogen reference electrode system structure, wherein the platinum hydrogen reference electrode system comprises an electrically conductive and electrochemically active platinum hydrogen reference electrode system region bound as a layer, directly or indirectly, to the surface of the disposable electrically insulating substrate, the hydrogen reference electrode system includes a platinum anode electrode and a platinum cathode electrode for use in a flow-through electrochemical cell assembly for a chromatography system, wherein the flow-through electrochemical cell assembly for a chromatography system further comprises:
 a cell body including a counter electrode structure in the form of the cell body or a wire;
 a working electrode structure insulated from the counter electrode structure;
 a gasket defining a sample flow pathway extending between an inlet and an outlet of a detection cell and in fluid contact with the cell body including the counter electrode and the working electrode structure; wherein the platinum hydrogen reference electrode system of the substrate is in fluidic contact with the counter electrode structure and the working electrode structure, the platinum anode electrode is operably connected to a positive pole of a power supply, and the platinum cathode electrode is operably connected to a negative pole of the power supply.

15. A disposable electrically insulating substrate according to claim 14 wherein the working electrode structure comprising an electrically conductive and electrochemically active working electrode region bound as a layer, directly or indirectly, to the surface of the substrate.

16. A disposable substrate according to claim 15 wherein the counter electrode structure comprising an electrically conductive and electrochemically active working electrode region bound as a layer, directly or indirectly, to the surface of the substrate.

17. A flow-through electrochemical cell assembly for a chromatography system comprising:
 a disposable electrically insulating substrate comprising a surface having a platinum hydrogen reference electrode system structure, wherein the platinum hydrogen reference electrode system comprises an electrically conductive and electrochemically active platinum hydrogen reference electrode system region bound as a layer, directly or indirectly, to the surface of the disposable electrically insulating substrate, the hydrogen reference electrode system includes a platinum anode electrode and a platinum cathode electrode;
 a cell body including a counter electrode structure in the form of the cell body or a wire;
 a working electrode structure insulated from the counter electrode structure; and
 a gasket defining a sample flow pathway extending between an inlet and an outlet of a detection cell and in fluid contact with the cell body including the counter electrode structure and the working electrode structure; wherein the platinum hydrogen reference electrode system is in fluidic contact with the counter electrode structure and the working electrode structure, the platinum anode electrode is operably connected to a positive pole of a power supply, and the platinum cathode electrode is operably connected to a negative pole of the power supply.

18. A flow-through electrochemical cell assembly for a chromatography system of claim 17 wherein the working electrode structure comprising an electrically conductive and electrochemically active working electrode region bound as a layer, directly or indirectly, to the surface of the substrate.

19. A flow-through electrochemical cell assembly for a chromatography system of claim 18 wherein the counter electrode structure comprising an electrically conductive and electrochemically active working electrode region bound as a layer, directly or indirectly, to the surface of the substrate.

20. The flow-through electrochemical cell assembly of claim 19, wherein the reference electrode system region, the working electrode region and/or the counter electrode region is exposed directly to said sample flow channel, without an intermediate layer.

21. The flow-through electrochemical cell assembly of claim 17, wherein at least a portion of the surface of the substrate is exposed to the sample flow channel.

22. The flow-through electrochemical cell assembly of claim 17, wherein the gasket forms a perimeter wall forming a fluid-tight seal at the periphery of said sample flow channel.

23. The flow-through electrochemical cell of claim 17, wherein the sample flow inlet is in fluid communication with a liquid chromatographic separator or flow injection analysis apparatus.

* * * * *